United States Patent
Soppelsa et al.

(10) Patent No.: US 6,487,010 B2
(45) Date of Patent: Nov. 26, 2002

(54) FOCUSING DRIVE FOR OPTICAL INSTRUMENTS

(75) Inventors: Peter Soppelsa, Balgach (CH); Vui Fah Loh, Singapore (SG)

(73) Assignee: Leica Microsystems AG, Heerbrugg (CH)

( * ) Notice: Subject to any disclaimer, the term of this patent is extended or adjusted under 35 U.S.C. 154(b) by 0 days.

(21) Appl. No.: 09/852,373

(22) Filed: May 10, 2001

(65) Prior Publication Data

US 2001/0040725 A1 Nov. 15, 2001

(30) Foreign Application Priority Data

May 15, 2000 (DE) .......................................... 100 23 568

(51) Int. Cl.$^7$ .............................................. G02B 21/00
(52) U.S. Cl. ....................................... 359/368; 359/392
(58) Field of Search ................................ 359/368, 382, 359/383, 391, 392, 393

(56) References Cited

U.S. PATENT DOCUMENTS 3,826,559 A  *  7/1974  Berliner et al.
5,608,573 A  *  3/1997  Mayer ......................... 359/392
5,689,366 A  * 11/1997  Sakamoto .................... 359/392

FOREIGN PATENT DOCUMENTS

| DE | 20 47 532 | 3/1972 |
| DE | 41 17 333 | 12/1991 |
| DE | 196 42 796 | 5/1997 |

* cited by examiner

*Primary Examiner*—Mark A. Robinson
(74) *Attorney, Agent, or Firm*—Hodgson Russ LLP

(57) ABSTRACT

The invention describes a focusing drive for optical instruments that has, in addition to a pinion (1) and toothed rack arrangement (1, 2), slide rods (4) as guidance means for continuously changing the relative position of optical assemblies with respect to one another. The toothed rack (2) has a plurality of support elements (3) that are arranged—for example in angled fashion—on either side of its longitudinal extent. The support elements (3) are designed so that they have a shallow S-shape in cross section. In addition, they are dimensioned in such a way that they touch the contact surface of the one housing module (5) only with their planar end regions (3a). The result is a resilient or flexing motion upon actuation of the pinion (1), thus achieving smooth and zero-backlash adjustment.

17 Claims, 2 Drawing Sheets

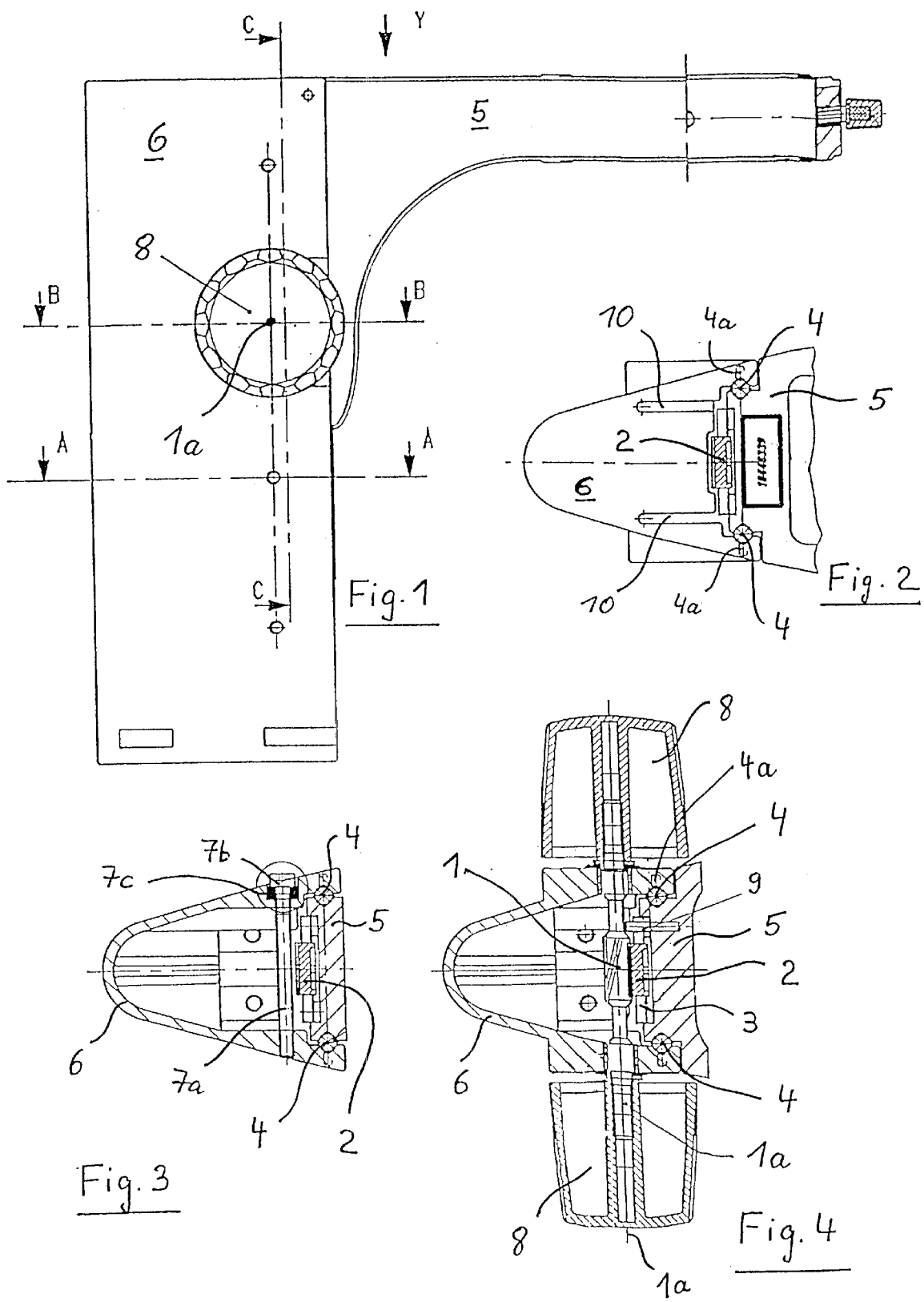

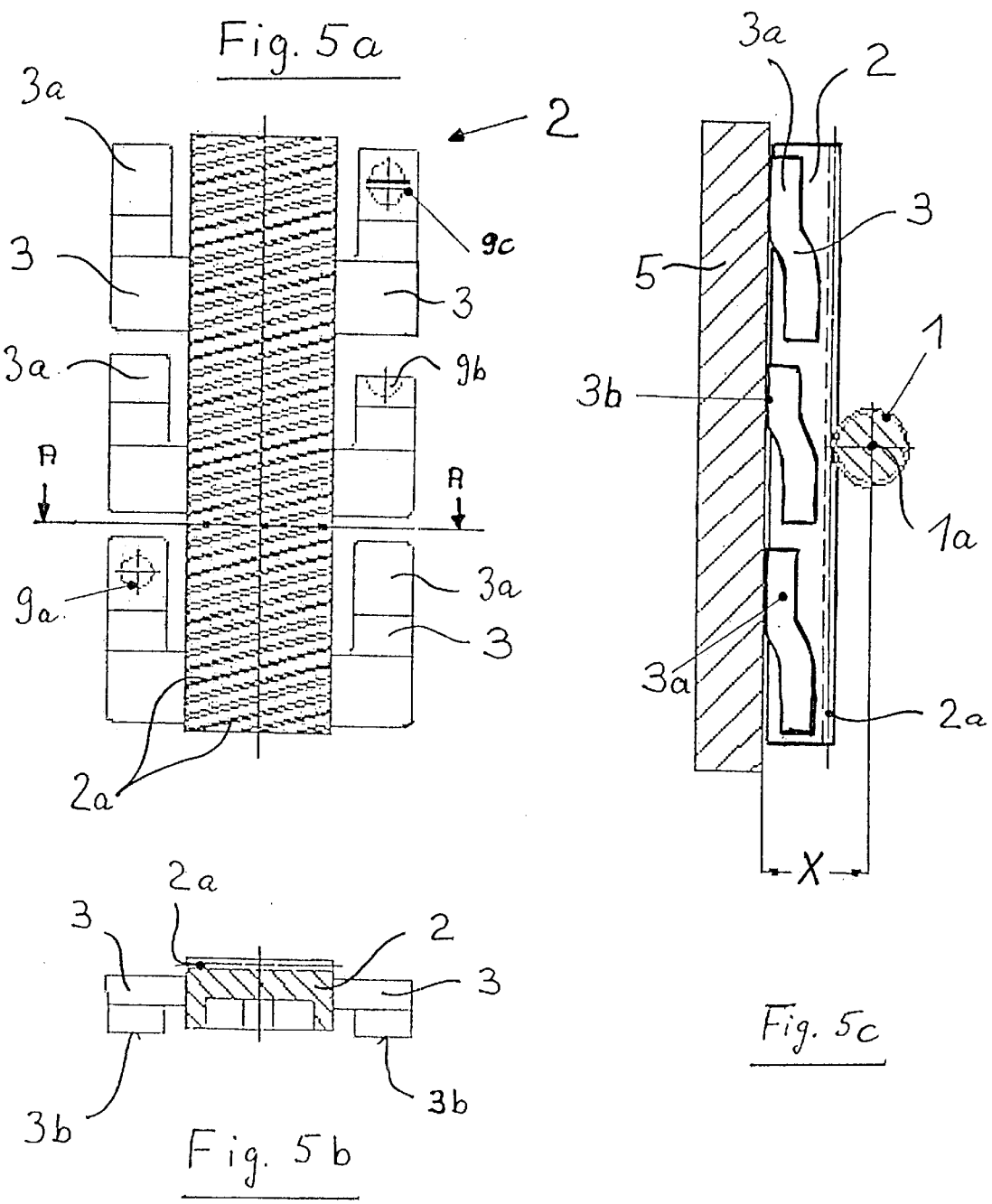

FOCUSING DRIVE FOR OPTICAL INSTRUMENTS

CROSS-REFERENCE TO RELATED APPLICATIONS

The present application claims priority under 35 U.S.C. 119 of German Patent Application No. 100 23 568.9 filed May 15, 2000.

FIELD OF THE INVENTION

The invention concerns a focusing drive for optical instruments, in particular microscopes. It has a pinion and toothed rack arrangement as well as guidance means for displacing a device component with respect to a stationary further component.

BACKGROUND OF THE INVENTION

With adjustment mechanisms of this kind, the problem often exists that aging and wear phenomena occur as the toothed rack and pinion interact, and jerky adjustment operations can result. The toothed racks must be carefully centered and aligned on the component that is to be displaced. This results in time-consuming and cost-intensive assembly procedures. Combined with the aforementioned wear susceptibility of such systems, with frequent use it is therefore impossible to obtain smooth, zero-backlash guidance over a long period of time.

BRIEF SUMMARY OF THE INVENTION

It is therefore the object of the present invention to eliminate the disadvantages of known focusing drive solutions and to describe a smooth and zero-backlash guidance mechanism that moreover can be installed in the optical device without alignment elements, resulting in economical manufacture.

This object is achieved, according to the present invention, by a focusing drive of the kind cited initially in that it is fitted with a plastic toothed rack that is equipped with a plurality of support elements and comprises parallel-mounted slide rods as guidance means. Special support elements are arranged on the toothed rack on either side of its longitudinal extent. These can be cantilevered from the toothed rack in arm-like fashion. The support elements are advantageously located on the toothed rack in paired fashion, so that one left arm and one right arm form, so to speak an arm "pair." It is also possible for the support elements to be cantilevered in L-shaped fashion on the toothed rack. In a particular embodiment of the present invention, the support elements are of resilient configuration. For example, they can have a stepped shape or be slightly S-shaped in longitudinal section. The support elements rest with their respective end regions against the device module that is to be displaced. A one-piece configuration of the toothed rack is advantageous.

The focusing drive according to the present invention furthermore has parallel slide rods as guidance means for the displacement of a device module relative to a stationary device stand. These rods can be positioned loosely in V-grooves, the grooves being provided on the one hand in the device module to be displaced and on the other hand in the stationary device stand. According to the present invention, the slide rods are held under compressive stress in their respective positions. This is implemented by the fact that the device stand externally surrounding the slide rods is physically equipped and dimensioned so as to result in a pressure-generating clamping effect on the slide rods. It is thereby possible to provide means for stable retention and controlled modification of the pressure. These means can comprise a rotary knob that is under a spring preload. Particularly significant is the fact that the slide rods are made of an electrically conductive plastic material, and are circular in cross section. Because of the specific material selected, it is possible to create a focusing drive in which displacement along the slide rods is accomplished in dry sliding fashion. It is also possible to provide means for adjusting or changing the drag of the focusing drive. According to the present invention, this focusing drive is intended for use in antistatic optical devices, in particular microscopes.

BRIEF DESCRIPTION OF THE DRAWINGS

The invention will now be described in more detail with reference to the appended drawings in which, in purely schematic fashion:

FIG. 1 shows, in a side view, the vertical portion of a stationary device stand having an attached displaceable holding arm;

FIG. 2 shows a view in detail of what is depicted in FIG. 1 (looking in direction Y);

FIG. 3 shows a horizontal section (A—A) of the vertical stand portion;

FIG. 4 shows a horizontal section (B—B) of what is depicted in FIG. 1;

FIG. 5a shows a plan view of (a portion of) the toothed rack according to the present invention;

FIG. 5b shows a section (A—A) through what is depicted in FIG. 5a; and

FIG. 5c shows a side view of what is depicted in FIG. 5a, with the pinion also drawn in.

DETAILED DESCRIPTION OF THE INVENTION

FIG. 1 depicts, in a side view, a vertical portion of a stationary stand 6 which shows a focusing knob 8 with its rotation axis 1a. An angled retaining arm 5, for example for a microscope specimen stage, is mounted displaceably along vertical stand 6.

FIG. 4 depicts a horizontal section along plane B—B of FIG. 1. The two focusing knobs 8 are visible. Located on their common axis 1a is pinion 1 which meshes with toothed rack 2. Located between stationary device stand 6 on the one hand and the displaceably retained device module 5 (retaining arm) on the other hand are two slide rods 4 which are retained loosely in correspondingly provided V-grooves. The slide rods are circular in cross section. If one focusing knob 8 is actuated, or if both focusing knobs 8 are actuated in the same direction, retaining arm 5 joined to toothed rack 2 then moves perpendicular to the drawing plane, either upward or downward.

FIGS. 5a through 5c depict different views of portions of toothed rack 2 according to the present invention. FIG. 5a shows a plan view of a portion of toothed rack 2. The actual toothed rack, which has a plurality of support elements 3 and is equipped with a helical tooth set 2a, is evident. In the case depicted, support elements 3 are depicted in pairs, specifically in the form of angled arms. Their end regions 3a form, so to speak, the "hands" on the angled "arms." With these end regions 3a, toothed rack 2 contacts the displaceable device module 5 over a plurality of surfaces. This is depicted by way of illustration in FIG. 5c. It is apparent that only end regions 3a of support elements 3 rest on or against device module 5 that is to be displaced. A certain clearance between the actual underside of the toothed rack and the contact surface of the displaceable device module 5 is clearly evident. It is also apparent from FIG. 5c that in the view depicted, support elements 3 are have a shallow S-shape, thus resulting in a cushioning effect. When pinion 1 is in operation, it exerts a certain pressure on the region of tooth set 2a of toothed rack 2, the toothed rack locally yielding in "resilient" fashion to that pressure. To describe the procedure in graphic terms, pinion 1 "flexes," so to speak, over toothed rack 2, and the latter elastically yields only in the immediate respective engagement region of pinion 1. According to the present invention, this "rolling" action permanently ensures smooth and zero-backlash actuation of the focusing drive, which is, in a manner of speaking, a self-aligning mechanism. This means that toothed rack 2 as such does not at all need to be dimensioned and positioned with extreme precision. Distance X visible in FIG. 5c between the contact surface of device module 5 and axis 1a of pinion 1 is dimensioned so as to ensure that the focusing drive functions in accordance with the present invention.

As indicated in FIG. 5a, toothed rack 2 can be mounted on the wall of device module 5 with bolts 9; some of end regions 3a can be equipped, for passage of the bolts, with either a hole 9a or a half-hole 9b or an elongated hole 9c. Elongated holes 9c compensate for any minor changes in the dimensions of toothed rack 2 or 2a and of support elements 3 or 3a that might occur, for example, as a result of temperature and other environmental influences. Advantageously, the complete toothed rack 2, 2a, 3, 3a is manufactured from a composite plastic material, made of "Delrin 577" with a 20% glass fiber content.

It is consistently evident from FIGS. 2 through 4 that slide rods 4 are retained in V-shaped grooves, the grooves being arranged on the one hand in the stationary device stand 6 and on the other hand in the displaceable device module 5. It is advantageous that each slide rod 4 has twist prevention. It is evident from FIG. 2 that this can be implemented in the form of a transverse pin 4a. It is further evident from FIG. 2 that device stand 6 is physically configured in cross section in such a way that it causes clamp-like pressure on the two slide rods 4. For that purpose, device stand 6 has in cross section (cf. FIG. 2) deep slots 10 that impart a stable clamping effect to the entire device module in this region. By way of an adjusting screw 7a that has a rotary knob 7b, which has in region 7c a spring (not depicted) that is under compressive stress, the clamping effect just described can be further enhanced or specifically preset. For that purpose, it is possible by firmly rotating both focusing knobs 8, simultaneously but in opposite directions, to generate an increased compressive stress on device stand 6, so that in this manner the "drag" of the focusing drive can be modified.

The slide rods are produced from electrically conductive plastic material, for example from a composite material reinforced with carbon fiber. This creates an electrically conductive connection between the two components (device module 5 and device stand 6) that are to be displaced, the advantageous result being that the arrangement described can be used in antistatic microscopes.

The focusing drive according to the present invention constitutes an economical adjustment mechanism between two optical device modules, achieving smooth and zero-backlash adjustment functionality on a permanent basis. Because of its design and specific material selection, the entire arrangement is very largely wear-free.

What is claimed is:

1. A focusing drive for changing the position of a second assembly (5) relative to a first assembly (6) in optical instruments, said focusing drive comprising:

a pinion (1) mounted on said first assembly;

an elongated plastic toothed rack (2) meshing with said pinion;

a plurality of L-shaped support elements (3) cantilevered from said toothed rack along a longitudinal extent of said toothed rack, each of said plurality of support elements having an end region (3a) attached to said second assembly (5) to mount said toothed rack on said second assembly, said plurality of support elements acting to resiliently bias said toothed rack into meshing engagement with said pinion; and a plurality of slide rods (4) extending parallel to a longitudinal axis of said toothed rack, each of said plurality of slide rods being slidably received by a groove in said first assembly (6) and by a groove in said second assembly (5) to guide relative displacement between said first and second assemblies;

whereby zero-backlash guidance is achieved.

2. The focusing drive as defined in claim 1, wherein said plurality of support elements (3) comprises support elements cantilevered from opposite sides of said toothed rack (2).

3. The focusing drive as defined in claim 2, wherein the support elements (3) are cantilevered from the toothed rack (2) in pairs with one support element (3) on one side of said toothed rack (2) in opposite relation to a corresponding support element (3) on the other side of the toothed rack.

4. The focusing drive as defined in claim 1, wherein each of said plurality of support elements (3) is configured in longitudinal section in a stepped or S-shape.

5. The focusing drive as defined in claim 1, wherein said plurality of support elements (3) rest with their respective end regions (3a) against the second assembly (5) that is to be displaced.

6. The focusing drive as defined in claim 1, wherein said toothed rack (2) and said plurality of support elements (3) are formed together as a one-piece configuration.

7. The focusing drive as defined in claim 1, characterized in that parallel slide rods (4) are provided as guidance means for the displacement of a device module (5) relative to a stationary device stand (6).

8. The focusing drive as defined in claim 7, characterized in that the slide rods (4) are held under compressive stress in their respective positions.

9. The focusing drive as defined in claim 8, characterized in that the device stand (6) externally surrounding the slide rods (4) is physically equipped and dimensioned so as to result in a pressure-generating clamping effect on the slide rods (4).

10. The focusing drive as defined in claim 9, characterized in that means for stable retention and controlled modification of the pressure are provided.

11. The focusing drive as defined in claim 10, characterized in that these means comprise a rotary knob (7) that is under a spring preload.

12. The focusing drive as defined in claim 1, characterized in that the slide rods (4) are positioned loosely in V-grooves which are provided on the one hand in the device module (5) to be displaced and on the other hand in the stationary device stand (6).

13. The focusing drive as defined in claim 1, characterized in that the slide rods (4) are made of an electrically conductive plastic material.

14. The focusing drive as defined in claim 1, characterized in that the slide rods (4) have a circular cross section.

15. The focusing drive as defined in claim 1, characterized in that displacement along the slide rods (4) is accomplished in dry sliding fashion.

16. The focusing drive as defined in claim 1, characterized in that means for adjusting or changing drag of the focusing drive are provided.

17. An antistatic microscope comprising:

a microscope stand (6);

a retaining arm (5) displaceable relative to said microscope stand (6);

a pinion (1) mounted on said microscope stand (6);

an elongated plastic toothed rack (2) meshing with said pinion;

a plurality of L-shaped support elements (3) cantilevered from said toothed rack along a longitudinal extent of said toothed rack, each of said plurality of support elements having an end region (3a) attached to said retaining arm (5) to mount said toothed rack on said retaining arm, said plurality of support elements acting to resiliently bias said toothed rack into meshing engagement with said pinion; and a plurality of slide rods (4) extending parallel to a longitudinal axis of said toothed rack, each of said plurality of slide rods being slidably received by a groove in said microscope stand (6) and by a groove in said retaining arm (5) to guide relative displacement between said microscope stand and said retaining arm;

whereby zero-backlash guidance is achieved.

* * * * *